Dec. 31, 1935.  L. RICEFIELD  2,025,827
COUPLING
Filed Aug. 11, 1934
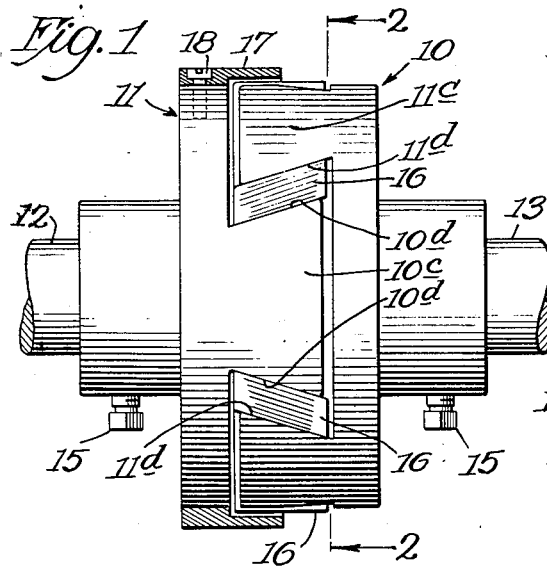
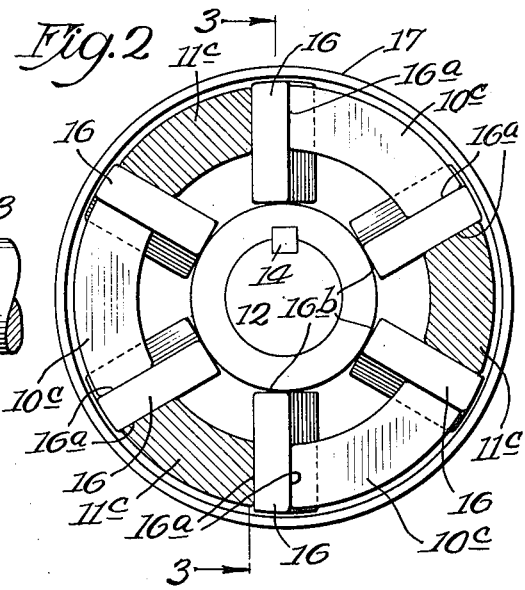
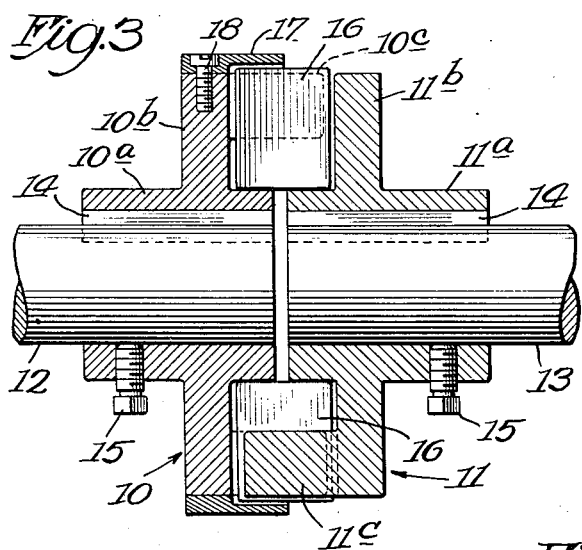
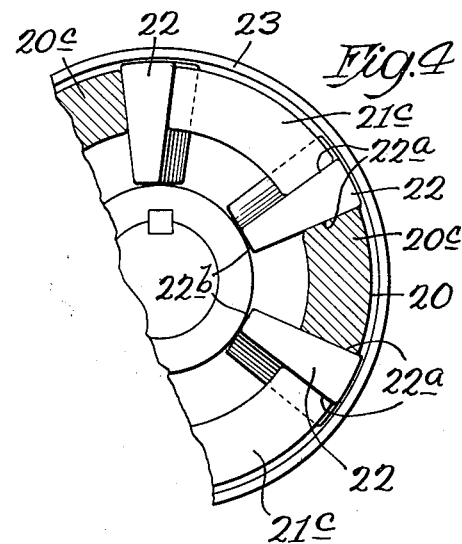
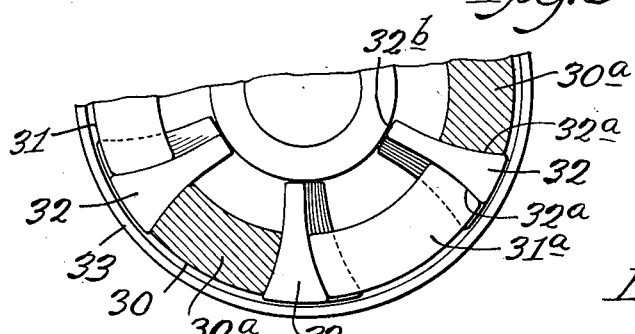
Inventor
Louis Ricefield

UNITED STATES PATENT OFFICE 2,025,827

COUPLING

Louis Ricefield, Oak Park, Ill.

Application August 11, 1934, Serial No. 739,419

7 Claims. (Cl. 64—14)

This invention relates to improvements in couplings and its purpose is to provide an improved device adapted for use in connecting substantially aligned rotating shafts for the purpose of transmitting power from one shaft to the other. This application is a continuation in part of my copending application Serial No. 600,155, filed March 21, 1932. It is well known that two connected shafts are ordinarily out of alignment to a greater or lesser degree either in the form of angular disalignment of the shafts or lateral displacement of their longitudinal axes, and, in addition, there is often a relative end play of the two shafts which must be compensated for by the coupling which connects them. The principal object of the present invention is to provide an improved flexible coupling adapted for use in connecting substantially aligned shafts which may be out of alignment in one or more of the particulars heretofore mentioned and the present improvement is particularly suited for connecting shafts of relatively large diameter. An important object of the invention is to provide means for connecting substantially aligned shafts by means of a flexible coupling comprising a pair of complementary coupling members each adapted to be secured upon one of the shafts and each having a plurality of lugs or jaws intermeshing loosely with the corresponding members of the other coupling member, these lugs or jaws being adapted to receive between them a plurality of separate independent power transmitting members constructed preferably in the form of blocks of rubber or other resilient material which are retained in place by an annular part secured to one of the coupling members. An important feature of the present invention is the provision of means whereby one or more of the resilient power transmitting members may be readily removed and replaced independently of the other. Still another object of the invention is to provide an improved flexible shaft coupling comprising a pair of complementary coupling members each adapted to be secured upon one of two substantially aligned shafts and each having a plurality of lugs or jaws intermeshing loosely with the lugs or jaws of the other member, these lugs or jaws having opposed faces which are adapted to contact with the corresponding faces of intervening power transmitting members, the coacting faces of the jaws and power transmitting members being inclined so that when forces are transmitted to the coupling members from one shaft to the other, the reaction between the contacting surfaces tends to draw the connected shafts endwise toward each other. Still another object of the invention is to provide an improved power transmitting coupling comprising complementary coupling members having intermeshing jaws which are spaced apart to receive between them a plurality of resilient power transmitting members which are so constructed that they vary in thickness outwardly from the axes of the shafts and are thus of greater thickness at the points where the greatest compression occurs when forces are transmitted through them from one coupling member to the other. A further important feature of the present invention is the provision of a power transmitting coupling comprising a pair of complementary coupling members having interposed between them a plurality of power transmitting members which are separate from each other and which are retained in place by the hubs of the power transmitting members and by an annular part secured to one of these members. Other features of the invention relate to various matters of design and arrangement which will appear more fully hereinafter.

The nature of the invention will be understood from the following specification taken with the accompanying drawing in which certain embodiments are illustrated.

In the drawing,—

Figure 1 shows a side elevation of one form of flexible power transmitting coupling embodying the features of the present invention with the outer retaining ring shown in section;

Fig. 2 shows a sectional view taken on the line 2—2 of Fig. 1;

Fig. 3 shows a vertical section taken on the line 3—3 of Fig. 2;

Fig. 4 shows a partial transverse section similar to that of Fig. 3 illustrating a modified form of the invention in which the power transmitting members have lug engaging surfaces which converge inwardly from the outer parts of these power transmitting members; and Fig. 5 is a partial sectional view similar to that of Fig. 2 showing still another form of the invention in which the power transmitting members located between the lugs or jaws of the coupling members have opposite faces adapted to engage the lugs or jaws of the opposite coupling members, whereby the power transmitting members are increased in thickness at the points where the greatest wear and compression occurs.

Referring to Figs. 1, 2 and 3 of the drawing, it will be seen that the first form of the invention comprises a pair of complementary coupling members 10 and 11, which are secured upon a pair of substantially aligned shafts 12 and 13, respectively, by means of keys 14 and also, preferably, by means of set screws 15 which are adapted to prevent endwise movement of the coupling members upon the shafts. These coupling members comprise hub portions $10^a$ and $11^a$ which have formed integrally therewith radiating disks $10^b$ and $11^b$, respectively. The coupling member 10 has formed integrally with the disk $10^b$ a series of inwardly extending lugs or jaws $10^c$ having opposite power transmitting surfaces $10^d$ which diverge away from the face of the disk $10^b$. Similarly, the coupling member 11 comprises a series of longitudinally extending lugs or jaws $11^c$ which are formed integrally with the disk $11^b$ and which have opposite power transmitting faces $11^d$ arranged to diverge away from the inner face of the disk $11^b$. In the form shown in Figs. 1, 2 and 3, the opposed faces $10^d$ and $11^d$ of adjacent lugs or jaws on the opposite coupling members are parallel to each other although inclined longitudinally with respect to a plane containing the axis of either of the connected shafts. Each pair of opposed parallel faces formed on the lugs or jaws of opposite coupling members is adapted to contact with the corresponding parallel faces $16^a$ of one of a series of intervening power transmitting members 16 which are constructed in the form of resilient blocks, formed preferably of rubber, combinations of rubber and fabric, leather or other suitable material. These blocks 16 are extended inwardly beyond the lugs or jaws $10^c$ and $11^c$ and terminate at their inner ends in surfaces $16^b$ which are adapted to contact with the surfaces of the hubs $10^a$ and $11^a$ of the coupling members which extend inwardly toward each other from the disks $10^b$ and $11^b$, respectively. In order to retain these power transmitting members 16 against radial outward movement under the influence of centrifugal force when the shafts are in rotation, there is secured to one of the coupling members 10 a retaining ring or flange 17 which is secured to the disk $10^b$ by means of a series of screws 18. This ring or flange 17 overlies portions of each of the power transmitting members 16 which are thus retained in their proper positions between the power transmitting jaws of the coupling members while at the same time being permitted to partake of such movement as may be necessary to compensate for misalignment of the shafts during their rotation and the transmission of power from one shaft to the other. It will be apparent that due to the inclination of the surfaces $16^a$ of the power transmitting members with respect to a plane containing the axis of either shaft, and the corresponding inclination of the opposed parallel faces of the lugs or jaws which contact with the power transmitting members, the forces set up in the parts by the transmission of power from one shaft to the other produces components tending to draw the two coupling members 10 and 11 toward each other longitudinally of the shaft, thus insuring the maintenance of the two coupling members in proper relation to each other.

In Fig. 4 of the drawing there is illustrated a modified form of construction which is in all respects similar to that illustrated in Figs. 1, 2 and 3, except that the coupling members secured upon the substantially aligned shafts are provided with intermeshing power transmitting lugs or jaws $20^c$ and $21^b$, respectively, which have opposed faces extending radially of the axes of the connecting shafts and adapted to contact with the correspondingly tapered faces of intervening power transmitting members 22 which may be formed of rubber, combinations of rubber and fabric, or other resilient material, and which have opposed lug engaging faces $22^a$ which converge gradually inward from the outer ends of the members along radii of the approximate axis of the two connected shafts. The inner ends of these tapered power transmitting members 22 have surfaces $22^b$ which engage the hubs of the coupling members 20 and 21 by which the jaws $20^a$ and $21^a$ are, respectively, carried, and these power transmitting members 22 are retained against outward movement by a retaining ring or flange 23 which is secured to the radial disk of one of the coupling members. In this form, also, the faces of the lugs or jaws $20^a$ and $21^a$ which contact with the faces $22^a$ of the power transmitting members are inclined longitudinally of the axes of connected shafts, in the manner illustrated in Fig. 1, so that the reaction set up by forces transmitted from one shaft to the other tend to produce relative endwise movement of the shafts toward each other.

In Fig. 5 of the drawing, there is illustrated a third modification of the invention which is similar to those previously described except that the two coupling members secured upon the two substantially aligned shafts have power transmitting lugs or jaws $30^a$ and $31^a$, respectively, which intermesh loosely with each other and which are adapted to coact with intervening power transmitting members 32. These power transmitting members 32 may preferably be formed of rubber, rubber composition, leather, or other resilient materials, and are so constructed that their opposed lug engaging faces $32^a$ converge gradually inward along curved lanes so that the thickness of each power transmitting member increases gradually from its inner portion outwardly in a manner which is proportional to the increase in compression upon the power transmitting member when forces are transmitted from one adjacent lug to the other during the rotation of the shaft. In this way, the thickness of each power transmitting member is so proportioned that the wear is substantially uniform thereon from its outer edge inwardly and uniform contact of all parts of the lug engaging surfaces of each power transmitting member with adjacent lugs is maintained even after long continued use of the coupling. As in the forms of the invention previously described, these power transmitting members 32 extend inwardly and have inner end surfaces $32^b$ which are adapted to engage the hubs of the coupling members 30 and 31 to which the lugs $30^a$ and $31^a$ are respectively attached. These power transmitting members 32 are retained against outward movement by a retaining ring or flange 33 which is detachably secured to the radial disk of one of the coupling members so that any one of the power transmitting members 32 may be removed and replaced independently of the other. By providing curved surfaces on the opposite sides of the power transmitting members, it is possible to cause uniform stresses to be set up in all parts of the member notwithstanding the greater relative angular movement of the outer portions of the jaws which contact with the power transmitting member during the compression. The internal stresses in the rubber depend not only upon the force applied and the extent of the movement but upon the thickness of the rubber compressed and these power transmitting members 32 are so formed that equal stresses are set up on all parts thereof, thus making all parts of these members equally durable.

Although certain forms of the invention have been shown and described by way of illustration, it will be understood that it may be constructed in various other embodiments coming within the scope of the appended claims.

I claim:

1. The combination in a coupling for connecting substantially aligned shafts, of a pair of coupling members each adapted to be secured to a separate one of said shafts, said coupling members each comprising lugs intermeshing with the lugs of the other coupling member, a plurality of separate power transmitting members of non-circular cross-section each interposed between and having surfaces of substantial area contacting with two adjacent lugs of opposite coupling members, the thickness of the material of each of said power transmitting members at any point outwardly from the axis of rotation being a function of the compressibility of said material and the distance of said point from said axis whereby equal compressive stresses are set up in all parts thereof when it is compressed by said lugs.

2. The combination in a coupling for connecting substantially aligned shafts, of a pair of coupling members each adapted to be secured to a separate one of said shafts, said coupling members each comprising lugs intermeshing with the lugs of the other coupling member, a plurality of separate resilient power transmitting members each interposed between and having curved surfaces contacting with two adjacent lugs of opposite coupling members, and a pair of annular retaining members disposed at opposite ends of said power transmitting members, said power transmitting members increasing in thickness from their inner ends outwardly along curved lines, the thickness of the material of each power transmitting member at any point outwardly from the axis of rotation of the coupling being a function of the compressibility of said material and of the distance of said point from said axis, whereby substantially equal compressive stresses are set up in all parts of said power transmitting member when it is compressed by said lugs.

3. The combination in a coupling for connecting substantially aligned shafts, of a pair of coupling members each adapted to be secured to one of said shafts, said coupling members having longitudinally extending jaws adapted to intermesh loosely with each other, and a plurality of power transmitting members each interposed between two of said jaws carried by opposite coupling members, each of said jaws having opposite surfaces which converge longitudinally of said shafts toward the body of the coupling member by which it is carried, said surfaces being arranged to coact with surfaces of said power transmitting members.

4. The combination in a coupling for connecting substantially aligned shafts, of a pair of coupling members each adapted to be secured upon one of said shafts, each of said coupling members being provided with a plurality of longitudinally extending jaws adapted to intermesh loosely with the jaws carried by the other coupling member, and a plurality of separate power transmitting members each interposed between two of said jaws carried by opposite coupling members, each of said jaws having opposite surfaces adapted to engage said power transmitting members, said surfaces converging inwardly toward the axis of said shaft and also converging endwise toward the body of the coupling member by which it is carried.

5. The combination in a coupling for connecting substantially aligned shafts, of a pair of coupling members each adapted to be secured upon one of said shafts, each of said coupling members being provided with a plurality of longitudinally extending jaws adapted to intermesh loosely with the jaws carried by the other coupling member, and a plurality of separate power transmitting members each interposed between two of said jaws carried by opposite coupling members, each of said jaws having opposite surfaces adapted to engage said power transmitting members, said surfaces converging inwardly toward the axis of said shaft and also converging endwise toward the body of the coupling member by which it is carried, and means for retaining said separate power transmitting members against radial displacement in either direction.

6. The combination in a coupling for connecting substantially aligned shafts, of a pair of coupling members each adapted to be secured on one of said shafts, a plurality of jaws formed on each of said coupling members to intermesh loosely with the jaws carried by the other coupling member, and a plurality of resilient power transmitting members each interposed between two of said jaws carried by opposite coupling members and having opposite flat surfaces adapted to contact with said jaws, said jaws and said power transmitting members having coacting surfaces which are inclined longitudinally of said shaft to set up forces tending to draw said coupling members toward each other when forces are transmitted through said power transmitting members from one coupling member to the other.

7. The combination in a coupling for connecting substantially aligned shafts, of a pair of coupling members each adapted to be secured on one of said shafts, a plurality of jaws formed on each of said coupling members to intermesh loosely with the jaws carried by the other coupling member, and a plurality of resilient compressible power transmitting members each interposed between two of said jaws carried by opposite coupling members and each having opposite outwardly diverging curved surfaces adapted to contact with said jaws, the coacting surfaces of said jaws and said power transmitting members being inclined longitudinally of said shaft to set up forces tending to draw said coupling members toward each other when forces are transmitted through said power transmitting members from one coupling member to the other.

LOUIS RICEFIELD.